Oct. 11, 1966
H. C. CHRISTENSEN
3,278,061
HAND TRUCK
Filed Feb. 3, 1964
2 Sheets-Sheet 1
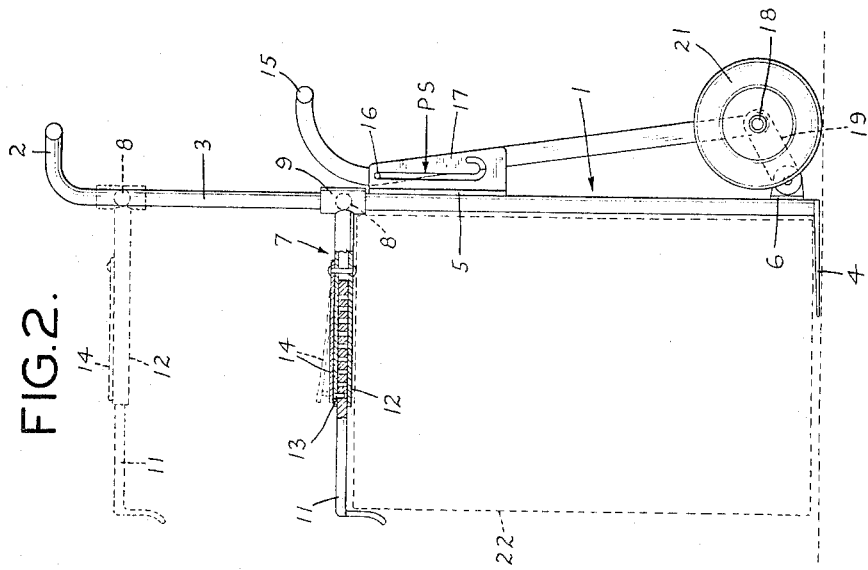
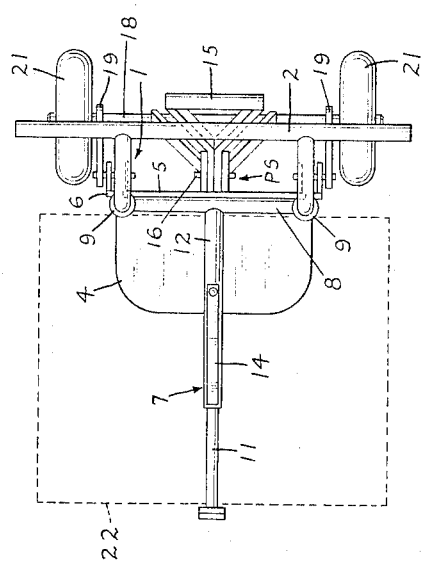
INVENTOR
HAROLD C. CHRISTENSEN
BY
Irving N. Simmons
ATTORNEY Oct. 11, 1966 H. C. CHRISTENSEN 3,278,061
HAND TRUCK
Filed Feb. 3, 1964
2 Sheets-Sheet 2
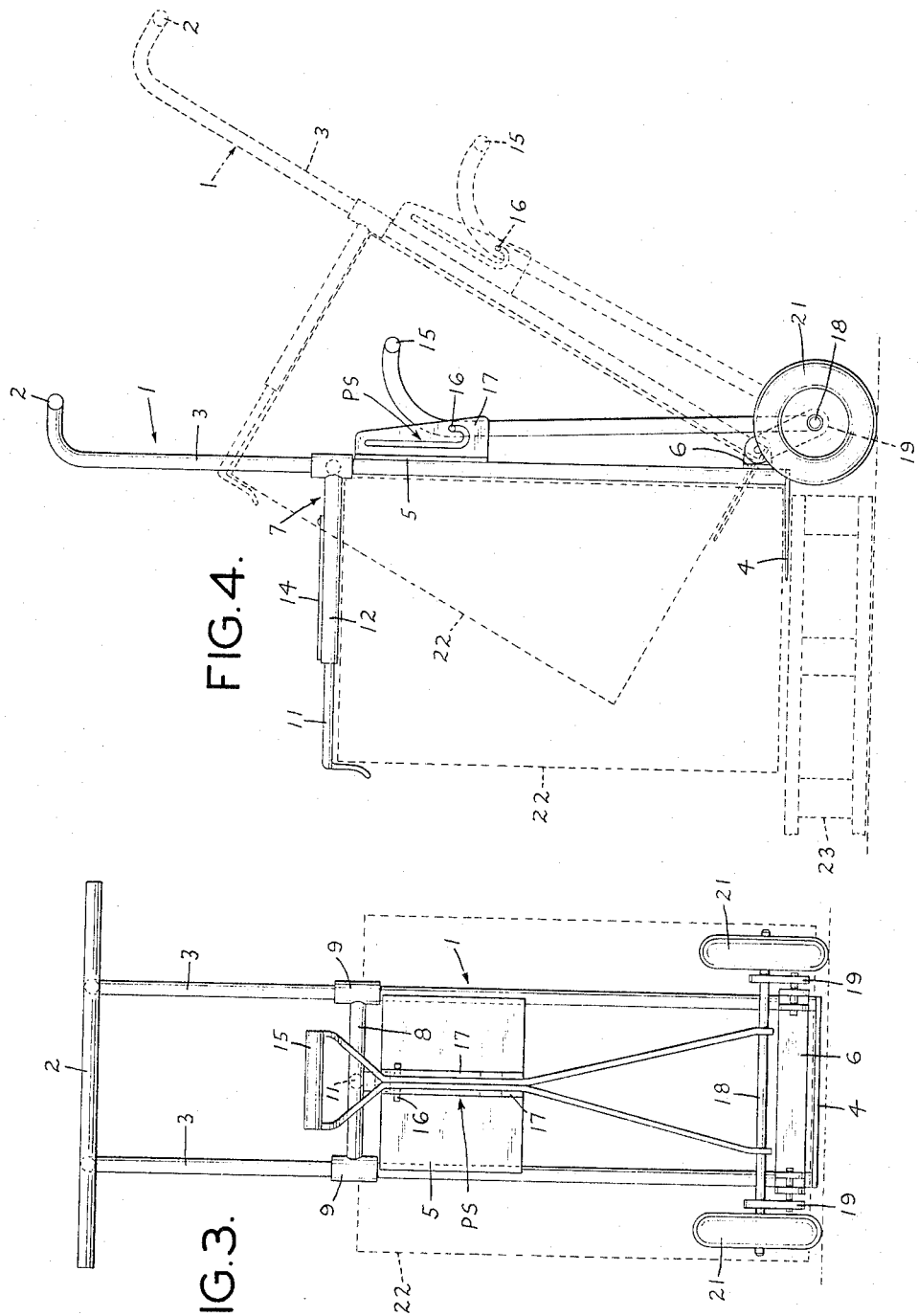
INVENTOR
HAROLD C. CHRISTENSEN
BY
Irving N. Simmons
ATTORNEY

United States Patent Office 3,278,061
Patented Oct. 11, 1966

3,278,061
HAND TRUCK
Harold C. Christensen, Croton-on-Hudson, N.Y., assignor to Allied Chemical Corporation, New York, N.Y., a corporation of New York
Filed Feb. 3, 1964, Ser. No. 341,993
3 Claims. (Cl. 214—383)

This invention relates to a hand truck for transporting various kinds of containers and, more specifically, to a manually operated lever hand truck used both for transporting and for raising and lowering such containers.

A need has arisen for a manually operated hand truck of simple mechanical and lightweight construction, which will not only provide support for routine moving of cartons, boxes, drums, and other containers, but will provide sufficient leverage and support for raising or lowering such containers to or from a predetermined level, typically the height of a wooden pallet or skids, which are, respectively, about 5 to 6 inches or 7 to 11 inches from the ground or floor level.

Varying state industrial regulations limit the permissible weight to be lifted by an employee. More than one man is required to lift a container exceeding such weight limitation to or from the pallet. Consequently, a hand truck which provides sufficient leverage for raising or lowering the load without taxing the employee beyond the permissible weight is advantageous. In addition to leverage, prevention of slippage or a shifting of the load must be provided by the hand truck as a safety measure.

An object of this invention is to provide a hand truck with means for raising and lowering containers to or from a predetermined level. Another object of this invention is to provide a hand truck which has sufficient leverage to permit one employee to raise and lower containers without using greater force than is permissible. A further object is to provide a hand truck with sufficient stability to raise and lower a load without danger of slippage or a shifting of the load. Still another object is to provide a hand truck of simple construction, which can be manually operated. Other objects and advantages will become apparent hereinafter.

Referring to the drawing:

FIGURE 1 is a plan view of the hand truck.

FIGURE 2 is a side view of the hand truck shown in FIGURE 1.

FIGURE 3 is a rear view of the hand truck shown in FIGURE 1.

FIGURE 4 is a side view of the hand truck with the solid line showing the truck at pallet level and the broken line showing the truck at a transporting angle.

A detailed description of the invention with reference to the drawing, in which like reference characters refer to like parts throughout the several figures of the drawing follows:

The two-level hand truck of this invention is constructed of frame assembly 1, which includes several connected portions. Frame assembly 1, which is typically a rigid metal piece, can be one unit or its parts can be connected by bolting, riveting, or welding. The material used can be solid, channelled, or tubular. Since a lightweight frame is preferable, the material should be channeled or tubular and the composition can be, for example, a magnesium alloy, alumnium, or stainless steel, the lighter weight materials being preferred. The parts of frame assembly 1 are handle bar member 2, two parallel frame members 3, pan 4, intermediate cross-piece 5, and lower cross-piece 6. Handle bar member 2 is attached to the upper extremities of the two frame members 3. Frame members 3 are connected to each other through handle bar member 2, intermediate and lower cross-pieces 5 and 6, and pan 4. Intermediate cross-piece 5 is a panel, the typical dimensions of which are about 12" x 12". This provides a strong support for the load; however, whether there is one or a plurality of cross-pieces depends on the size of each cross-piece and the desired size and strength of the frame. Handle bar member 2 and pan 4 are equivalent to cross-pieces and add to the rigidity of the structure. Pan 4 is a flat bottomed wedge-shaped piece with a narrow front edge and an upper surface which inclines slightly upward toward the rear where the pan is attached to frame members 3. This wedge shape permits the pan to be easily shoveled under the container. The area of pan 4 should be sufficient to accommodate the various sizes of containers to be transported. Typically, the distance between parallel frame members 3 is about 12", the length or height of frame members 3 is about 48", and the extension of pan 4 from frame members 3 is about 12".

Grip arm 7 is slidably connected to frame assembly 1. It does not have to be secured since it is prevented from dropping into an inconvenient position by intermediate cross-piece 5. Grip arm 7 can be attached to the frame assembly 1 in any manner, slidably or by hinges, just so long as it can be positioned to retain the container securely on the pan and against the frame. In the drawing, grip arm 7 is an L-shaped piece attached to cross-bar 8, the latter being attached to frame members 3 by sleeves 9. Grip arm 7 extends from the center of cross-bar 8 and includes a hook or L-shaped member 11 which overlaps the edge of and retains container 22. Grip arm 7 is shown as telescopic so that it is adjustable to accommodate containers of various sizes. In order to provide a secure grip, outer telescopic piece 12 is provided with an aperture at its outer extremity and pin 13 positioned so that it can be pushed into the aperture. Pin 13 is attached to spring 14 connected to the surface of outer telescopic piece 12. The inner telescopic piece, previously designated as L-shaped piece 11, is provided with a plurality of holes each of which can be aligned with the aperture in outer telescopic piece 12. Pin 13 is pushed into the aligned apertures to secure telescopic grip arm 7. If the size of the top of the container to be transported is known, this telescopic arrangement is unnecessary and grip arm 7 can be a unitary L-shaped piece. If the height of the container is known, the hook or L-shaped member 11 can be hinged and grip arm 7 fixedly attached to frame assembly 1.

Raising, lowering, and locking the hand truck is mainly accomplished by the use of lock handle 15, which is attached to frame assembly 1 by a pin-and-slot connection PS through intermediate cross-piece 5, which is provided with a pair of parallel slotted panels 17, usually welded thereto. Slotted panels 17 are perpendicular to intermediate cross-piece 5 and parallel to frame members 3. Dual pin 16 is attached to the upper end of lock handle 15 and engages slotted panels 17. The slots have a U-shape with one end of the slot or U at a higher elevation than the other end of the slot, the difference in elevation of the ends of the slots representing the distance, typically about 5 to 6 inches, which the truck can be raised or lowered. The wight of the truck and the position of wheels 21 lock dual pin 16 at either end of the slots. At the other end, lock handle 15 is pivotally connected to axle 18, which is pivotally connected to a pair of lever arms 19. Lever arms 19, which are adapted to describe a vertical swinging motion, are pivotally connected to frame members 3 and a pair of wheels 21, typically about 8 to 10 inches in diameter, are fixedly connected to axle 18. Bolts, rivets, or pins can be used to make the pivotal connections.

The mode of operation is as follows: Lock handle 15 is adjusted so that dual pin 16 is at the uppermost point of the U-shaped slot. In this position pan 4 and wheels 21 are resting at the same level (see FIGS. 1-3). Pan 4 is shoveled under container 22, which is typically a corrugated cardboard carton containing a 300 pound load, resting on the ground or floor. Grip arm 7 is lowered until it rests against the top of container 22. Grip arm 7 is then adjusted as noted, supra, so that hook or L-shaped member 11 firmly grasps container 22 and container 22 is secured against frame assembly 1. Handle bar 2 is then pushed forward so that container 22 supports the truck and load on its forward bottom edge. This emphasizes the desirability of lightweight construction. Lock handle 15 is moved until dual pin 16 is at the other and lower end of the U-shaped slot. The movement of lock handle 15 moves arms 19 and wheels 21 so that wheels 21 are now in their lowest position. The truck is now supported by wheels 21 and the forward bottom edge of container 22. The operator places his foot against axle 18, which serves as a fulcrum, and handle bar member 2 is then pulled backward, the truck assuming a vertical position supported by wheels 21 alone. Pan 4 is now substantially horizontal and at pallet level (see FIG. 4). Handle bar member 2 is pulled further back until the truck is in an angular position, the angle being such that the employee can comfortably push the truck from one position on the ground or floor to another position (see FIG. 4). When pallet 23 or another elevated point is reached, the operator, holding one foot against axle 18, pushes handle bar member 2 forward placing the truck in the vertical position so that pan 4 rests on the pallet and can be easily removed from underneath container 22 after grip arm 7 is released (see FIG. 4).

If the operator wishes to remove the container from pallet 23, lock handle 15 is engaged in the lower position and pan 4 shoveled under container 22 on pallet 23. At this point wheels 21 are on the ground or floor level and pan 4 is at pallet level (see FIG. 4). Grip arm 7 is then adjusted to retain the container. The operator places his foot against axle 18 and handle bar member 2 is pulled backward until the container is in the angular transporting position (see FIG. 4). If unloading container 22 at ground or floor level is desired, the operator's foot is placed on axle 18 and handle bar member 2 is pushed forward until the lower forward edge of container 22 and wheels 21 support the load. Lock handle 15 is moved so that dual pin 16 is pushed to the upper end of the U-shaped slot. As noted, at this point wheels 21 and pan 4 are at the same level (see FIGS. 1–3). Handle bar member 2 is then pulled backward so that wheels 21 and pan 4 rest on the ground or floor. Grip arm assembly 7 is then disengaged and pan 4 withdrawn from underneath container 22.

I claim:
1. A hand truck comprising:
 (a) a frame assembly, adapted to support a container, provided at its upper end with a handle bar member and at its lower end with a pan adapted to be inserted under the container to be lifted and to support the container on the truck;
 (b) a grip arm connected to the frame assembly adapted to engage an edge of the container and hold it against the frame;
 (c) lever arms pivotally connected at one end to the pan end of the frame assembly, adapted to describe a vertical swinging motion;
 (d) an axle rotatably connected to the lever arms at the ends of said lever arms opposite the pan end of the frame assembly;
 (e) wheels fixedly connected to the axle;
 (f) a lock handle slidably connected at one end to the frame assembly by a pin-and-slot connection and pivotally connected at the other end to the axle so that when the lock handle is at its highest point, the pan and the wheels are on the same level and when the lock is at its lowest point, the pan is elevated with respect to the wheels.

2. A hand truck comprising:
 (a) a frame assembly, adapted to support a container, provided at its upper end with a handle bar member, provided intermediate of its ends with a vertical slot, and provided at its lower end with a pan adapted to be inserted under the container to be lifted and to support the container on the truck;
 (b) a grip arm connected to the frame assembly adapted to engage an edge of the container and hold it against the frame;
 (c) lever arms pivotally connected at one end to the pan end of the frame assembly, adapted to describe a vertical swinging motion;
 (d) an axle rotatably connected to the lever arms at the ends of said lever arms opposite the pan end of the frame assembly;
 (e) wheels fixedly connected to the axle;
 (f) a lock handle with a pin at one end slidably connected at the pin end to the frame assembly by a pin-and-slot connection and pivotally connected at the other end to the axle so that when the lock handle pin is at the upper end of the slot, the pan and wheels are on the same level and when the lock handle pin is at the lower end of the slot, the pan is elevated with respect to the wheels.

3. A hand truck comprising:
 (a) a frame assembly constructed of two parallel frame members, said frame members fixedly connected at one end by a handle bar member, fixedly connected intermediate of the ends by a cross-piece having a pair of spaced parallel slotted panels wherein the slots are U-shaped with one end of the slot being at a higher elevation than the other end of the slot, said panels being affixed perpendicular to the cross-piece and parallel to the frame members, and, said frame members fixedly connected at the other end by a pan substantially perpendicular to the frame members and extending from the frame members in an opposite direction from the slotted panels;
 (b) a telescopic L-shaped grip arm slidably connected to the frame members between the handle bar member and the cross-piece, said grip arm being substantially perpendicular to the frame members and extending in the same direction as the pan, the gripping extremity of the grip arm being directed toward the pan;
 (c) a pair of lever arms, each pivotally connected to the end of each frame member adjacent to the pan and extending in an opposite direction therefrom, adapted to describe a vertical swinging motion;
 (d) an axle rotatably connected to the lever arms at the ends of said lever arms opposite the pan end of the frame assembly;
 (e) a pair of wheels each fixedly connected to each end of the axle at the ends opposite the frame members;
 (f) a lock handle having a dual pin at one end and connected at said end to the slotted panels of the cross-piece by a pin-and-slot connection and pivotally connected at the other end to the axle, so that when the dual pin is at one end of the slots, the pan and wheels are locked on the same level and when the dual pin is at the other end of the slots the pan is elevated with respect to the wheels and locked in said position.

References Cited by the Examiner
UNITED STATES PATENTS
1,965,944  7/1934  Lea.
2,539,233  1/1951  Dickson _____ 280—47.29 X
FOREIGN PATENTS
823,982  12/1951  Germany.

GERALD M. FORLENZA, *Primary Examiner.*
A. J. MAKAY, *Assistant Examiner.*